US011615800B2

(12) United States Patent
Bisio et al.

(10) Patent No.: US 11,615,800 B2
(45) Date of Patent: Mar. 28, 2023

(54) SPEAKER RECOGNITION METHOD AND SYSTEM

(71) Applicant: TELECOM ITALIA S.p.A., Milan (IT)

(72) Inventors: Igor Bisio, Genoa (IT); Cristina Fra', Milan (IT); Chiara Garibotto, Genoa (IT); Fabio Lavagetto, Genoa (IT); Andrea Sciarrone, Genoa (IT); Massimo Valla, Milan (IT)

(73) Assignee: TELECOM ITALIA S.p.A., Milan (IT)

( * ) Notice: Subject to any disclaimer, the term of this patent is extended or adjusted under 35 U.S.C. 154(b) by 565 days.

(21) Appl. No.: 16/495,891

(22) PCT Filed: Apr. 18, 2018

(86) PCT No.: PCT/EP2018/059839
§ 371 (c)(1),
(2) Date: Sep. 20, 2019

(87) PCT Pub. No.: WO2018/192941
PCT Pub. Date: Oct. 25, 2018

(65) Prior Publication Data
US 2020/0098375 A1 Mar. 26, 2020

(30) Foreign Application Priority Data
Apr. 21, 2017 (IT) .................. 102017000044093

(51) Int. Cl.
G10L 17/00 (2013.01)
G10L 17/06 (2013.01)
(Continued)

(52) U.S. Cl.
CPC .............. G10L 17/06 (2013.01); G10L 17/00 (2013.01); G10L 17/02 (2013.01);
(Continued)

(58) Field of Classification Search
CPC ............. G10L 15/02; G10L 2015/0635; G10L 2015/0636; G10L 15/07; G10L 15/065;
(Continued)

(56) References Cited

U.S. PATENT DOCUMENTS 7,774,202 B2 * 8/2010 Spengler ................. G10L 15/22
704/241
10,540,979 B2 * 1/2020 Visser ..................... G10L 15/22
(Continued)

FOREIGN PATENT DOCUMENTS

WO    WO-2006126216 A1 * 11/2006 ............. G10L 17/04

OTHER PUBLICATIONS

M. H. Moattar and M. M. Homayounpour, "A simple but efficient real-time Voice Activity Detection algorithm," 2009 17th European Signal Processing Conference, 2009, pp. 2549-2553. (Year: 2009).*

(Continued)

Primary Examiner — Edgar X Guerra-Erazo
(74) Attorney, Agent, or Firm — Oblon, McClelland, Maier & Neustadt, L.L.P.

(57) ABSTRACT

A speaker recognition system for assessing the identity of a speaker through a speech signal based on speech uttered by said speaker is provided. The system includes a framing module that subdivides the speech signal over time into a set of frames, and a filtering module that analyzes the frames of the set to discard frames affected by noise and frames which do not comprise a speech, based on a spectral analysis of the frames. A feature extraction module extracts audio features from frames which have not been discarded, and a classification module processes the audio features extracted from the frames which have not been discarded for assessing the identity of the speaker.

13 Claims, 5 Drawing Sheets

(51) Int. Cl.
  *G10L 17/02* (2013.01)
  *G10L 21/0232* (2013.01)
  *G10L 25/18* (2013.01)
  *G10L 25/21* (2013.01)
  *G10L 25/84* (2013.01)

(52) U.S. Cl.
  CPC .......... *G10L 21/0232* (2013.01); *G10L 25/18* (2013.01); *G10L 25/21* (2013.01); *G10L 25/84* (2013.01)

(58) Field of Classification Search
  CPC ....... G10L 15/08; G10L 15/083; G10L 15/14; G10L 15/144; G10L 15/142; G10L 15/16; G10L 15/148; G10L 15/06; G10L 15/20; G10L 15/22; G10L 21/0208; G10L 15/26; G10L 17/00; G10L 17/02; G10L 17/04; G10L 17/08; G10L 17/06; G10L 17/10; G10L 17/12; G10L 17/16; G10L 17/20; G10L 17/22; G10L 17/26; G10L 19/012; G10L 19/02; G10L 19/022; G10L 19/025; G10L 19/028; G10L 19/03; G10L 19/06; G10L 19/265; G10L 19/26; G10L 21/003; G10L 21/02; G10L 2021/02085; G10L 2021/02087; G10L 21/0216; G10L 2021/02168; G10L 21/0232; G10L 2021/02161; G10L 21/0224; G10L 21/028; G10L 21/0316; G10L 21/0332; G10L 21/034; G10L 21/0364; G10L 21/038; G10L 21/057; G10L 25/00; G10L 25/03; G10L 25/15; G10L 25/18; G10L 25/21; G10L 25/24; G10L 25/30; G10L 25/27; G10L 25/45; G10L 25/51; G10L 25/54; G10L 25/63; G10L 25/60; G10L 25/69; G10L 25/72; G10L 25/75; G10L 25/78; G10L 2025/783; G10L 2025/786; G10L 25/84; G10L 25/87; G10L 2025/935; G10L 25/93; G10L 2025/932; G10L 2025/937
  See application file for complete search history.

(56) References Cited

U.S. PATENT DOCUMENTS

2007/0288242 A1* 12/2007 Spengler ................. G10L 15/20
  704/E15.04
2012/0303369 A1* 11/2012 Brush ..................... G10L 17/02
  704/E17.001
2016/0203833 A1* 7/2016 Zhu ........................ G10L 25/78
  704/233

OTHER PUBLICATIONS

Jin Young Kim, Dae Young Ko and Seung You Na, "Implementation and enhancement of GMM face recognition systems using flatness measure," RO-MAN 2004. 13th IEEE International Workshop on Robot and Human Interactive Communication (IEEE Catalog No. 04TH8759), 2004, pp. 247-251. (Year: 2004).*

D. Hosseinzadeh and S. Krishnan, "Combining Vocal Source and MFCC Features for Enhanced Speaker Recognition Performance Using GMMs," 2007 IEEE 9th Workshop on Multimedia Signal Processing, 2007, pp. 365-368. (Year: 2007).*

Hosseinzadeh, Danoush, and Sridhar Krishnan. "On the use of complementary spectral features for speaker recognition." EURASIP Journal on Advances in Signal Processing 2008 (2007): 1-10. (Year: 2007).*

Ma, Yanna, and Akinori Nishihara. "Efficient voice activity detection algorithm using long-term spectral flatness measure." EURASIP Journal on Audio, Speech, and Music Processing 2013.1 (2013): 1-18. (Year: 2013).*

J. M. Lovekin, R. E. Yantorno, K. R. Krishnamachari, D. S. Benincasa and S. J. Wenndt, "Developing usable speech criteria for speaker identification technology," 2001 IEEE International Conference on Acoustics, Speech, and Signal Processing. Proceedings (Cat. No. 01CH37221), 2001, pp. 421-424 vol. 1. (Year: 2001).*

T. Konuma, T. Suzuki, M. Yamada, Y. Ohno, M. Hoshimi and K. Niyada, "Speaker independent speech recognition method with constrained time alignment near phoneme discriminative frame," 1997 IEEE Workshop on Automatic Speech Recognition and Understanding Proceedings, 1997, pp. 458-465. (Year: 1997).*

International Search Report and Written Opinion dated Aug. 10, 2018 in PCT/EP2018/059839 filed on Apr. 18, 2018.

Padmanabhan, R., "Studies on Voice Activity Detection and Feature Diversity for Speaker Recognition", Department of Computer Science and Engineering, Indian Institute of Technology, Madras, Aug. 2012, XP055437817, 156 total pages.

Beritelli, F. et al., "Performance Evaluation of Automatic Speaker Recognition Techniques for Forensic Applications", In: "New Trends and Developments in Biometrics", Intech, 2012, XP055436983, pp. 129-148.

Anonymous, "Spectral flatness", Wikipedia, 2014, XP055437792, pp. 1-2.

* cited by examiner

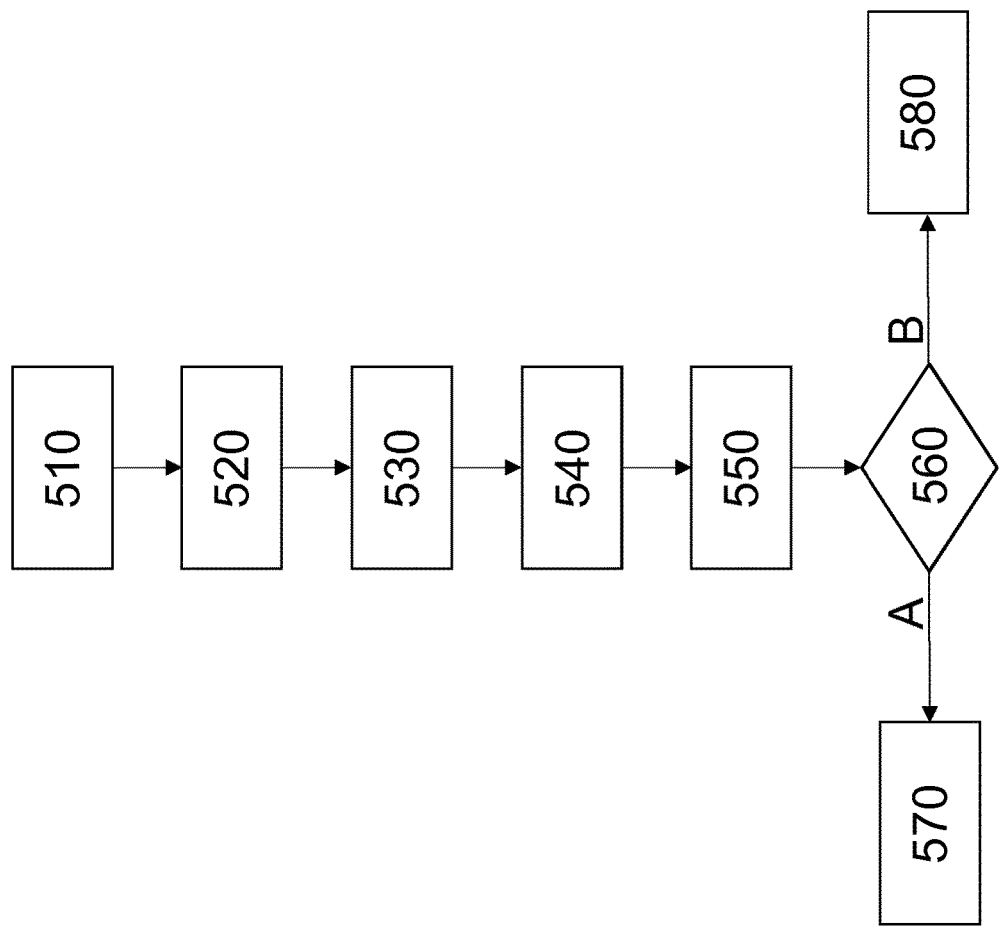

SPEAKER RECOGNITION METHOD AND SYSTEM

BACKGROUND OF THE INVENTION

Field of the Invention

The present invention generally relates to the speaker recognition field. More particularly, the present invention relates to a method and a system for identifying or confirming the identity of individuals based on the voice thereof.

Overview of the Related Art

Speaker recognition is a process that allows to recognize the identity of speakers based on an analysis carried out on features of the voices thereof. Practical applications of speaker recognition may be subdivided into two broad categories, namely the so-called "speaker identification" and the so-called "speaker verification". Speaker identification is used to find out the identity of a speaker among a predefined set of known speakers, while speaker verification is used to verify whether a speaker is an authorized person or not.

Applications of speaker recognition are wide ranging, including enabling context-aware applications in different scenarios, verifying identity in e-commerce applications as well as in general business interactions, enabling biometric access control to restricted facilities and electronic devices. Moreover, speaker recognition may be advantageously exploited also in forensics, and law enforcement applications.

For example, speaker identification may be exploited for improving the efficiency of a meeting. In this scenario, a single microphone (e.g., located on the meeting table) may be provided, which is configured to be exploited by a plurality of different speakers. Speaker identification may be advantageously exploited to automatically assess who is speaking (even if he/she is far from the microphone itself), in order to provide corresponding useful information related, for example, to the amount of time each speaker has spoken.

Speaker verification may be for example exploited to selectively grant/deny access to a restricted area. In this scenario, a restricted area may be accessed by only a group of authorized individuals. Speaker verification may be advantageously used to implement a biometric authentication procedure for assessing whether an individual belongs or not to such group based on his/her voice, and then accordingly grant/deny access to such restricted area according to the result of the biometric authentication.

EP 2713367 discloses a method for text-dependent speaker recognition using a speaker adapted universal background model, wherein the speaker adapted universal background model is a speaker adapted hidden Markov model comprising channel correction.

EP 2048656 is directed to a method for automatic speaker recognition based on a received speech input, wherein a speaker model set comprising at least a speaker-independent speaker model is provided. The method comprises the steps of detecting whether the received speech input matches a speaker model of the speaker model set according to a predetermined criterion; and, if no match is detected, creating a speaker model for the speaker model set based on the received speech input.

US 2008/0312926 discloses an automatic dual-step, text independent, language-independent speaker voice-print creation and speaker recognition method. A neural network-based technique is used in a first step and a Markov model-based technique is used in a second step. In particular, the first step uses a neural network-based technique for decoding the content of what is uttered by the speaker in terms of language independent acoustic-phonetic classes, wherein the second step uses the sequence of language-independent acoustic-phonetic classes from the first step and employs a Markov model-based technique for creating the speaker voice-print and for recognizing the speaker. The combination of the two steps enables improvement in the accuracy and efficiency of the speaker voice-print creation and of the speaker recognition, without setting any constraints on the lexical content of the speaker utterance and on the language thereof.

SUMMARY OF THE INVENTION

The Applicant has found that the known speaker recognition methods described above are affected by several drawbacks.

The method disclosed in EP 2713367 employs a text-dependent approach, which compels speakers to utter specific sentences in order to train classifiers. Moreover, the method of EP 2713367 requires a Universal Background Model (UBM) implemented with a Hidden Markov Model (HMM); as it is known to those skilled in the art, in order to generate a UBM, a large amount of speech samples are required. Moreover, the efficiency of the method of EP 2713367 is strongly reduced when the speech signal captured from the speakers is affected by noise and/or when it comprises portions which do not comprise any speech.

As in the method of EP 2713367, the method described in EP 2048656 as well uses a UBM which requires a large amount of speech samples to be generated.

Moreover, as in the method of EP 2713367, both the methods of EP 2048656 and US 2008/0312926 have a strongly reduced efficiency when the speech signal captured from the speakers is affected by noise or when it comprises noise portions.

In view of the above, Applicant has faced the problem of increasing the efficiency of the known speaker recognition methods and systems, as well as reducing the computational burden thereof.

In very general terms, the Applicant has found that the efficiency of a speaker recognition method/system can be strongly increased if the speech signal captured from the speakers is pre-filtered in order to remove portions thereof comprising high levels of noise and portions thereof which do not comprise a speech.

An aspect of the present invention relates to a speaker recognition system for assessing the identity of a speaker through a speech signal based on speech uttered by said speaker.

According to an embodiment of the present invention, the speaker recognition system comprises a framing module configured to subdivide said speech signal over time into a set of frames.

According to an embodiment of the present invention, the speaker recognition system comprises a filtering module configured to analyze the frames of the set to discard frames affected by noise and frames which do not comprise a speech, based on a spectral analysis of the frames.

According to an embodiment of the present invention, the speaker recognition system comprises a feature extraction module configured to extract audio features from frames which have not been discarded.

According to an embodiment of the present invention, the speaker recognition system comprises a classification module configured to process the audio features extracted from the frames which have not been discarded for assessing the identity of the speaker.

According to an embodiment of the present invention, the filtering module comprises a flatness estimator module configured to assess whether a frame has to be discarded based on the flatness of the frequency spectrum of such frame.

According to an embodiment of the present invention, said filtering module is configured to discard a frame if the flatness estimator module has assessed that said frame has to be discarded because said frame has a substantially flat spectrum.

According to an embodiment of the present invention, the flatness estimator module is configured to assess the flatness of the spectrum of a frame by generating a corresponding flatness parameter based on a ratio of:
the geometric mean of samples of the energy density of said frame;
to
the arithmetic mean of said samples of the energy density of said frame.

According to an embodiment of the present invention, the flatness estimator module is configured to assess that said frame has to be discarded if the corresponding flatness parameter is higher than a corresponding first threshold.

According to an embodiment of the present invention, said first threshold is lower than zero, such as for example equal to −6.

According to an embodiment of the present invention, the filtering module comprises an energy estimator module configured to assess whether a frame has to be discarded based on how the spectral energy of said frame is distributed over frequency.

According to an embodiment of the present invention, said filtering module is configured to discard a frame if the energy estimator module has assessed that said frame has to be discarded because said frame has a substantial amount of energy above an upper frequency threshold.

According to an embodiment of the present invention, the energy estimator module is configured to calculate an energy parameter of a corresponding frame based on a ratio of:
the energy of the frame pertaining to frequencies lower than said upper frequency threshold;
to
the total energy of the frame.

According to an embodiment of the present invention, the energy estimator module is further configured to assess that said frame has to be discarded if the corresponding energy parameter is lower than a second threshold.

According to an embodiment of the present invention, said second threshold ranges from 0 to 1.

According to an embodiment of the present invention, the second threshold is equal to 0.76. According to an embodiment of the present invention, the classification module is configured to generate for each known speaker of a predefined set of known speakers a corresponding score quantifying the likelihood that the speaker having uttered said speech is said known speaker, said generating the score being based on said audio features extracted from the frames which have not been discarded.

According to an embodiment of the present invention, the classification module is configured to:
compare the highest score among the scores generated for each known speaker of the predefined set to a score threshold;
assess that the speaker having uttered said speech does not belong to the predefined set of known speakers if the highest score is lower than said score threshold, and
assess that the speaker having uttered said speech is the known speaker of the predefined set of known speakers corresponding to said highest score if said highest score is higher than the score threshold.

According to an embodiment of the present invention, said score threshold ranges from −0.5 to 0.5.

According to an embodiment of the present invention, said score threshold is equal to 0.

According to an embodiment of the present invention, the classification module is configured to:
compare the lowest score among the scores generated for each known speaker of the predefined set to a score threshold;
assess that the speaker having uttered said speech does not belong to the predefined set of known speakers if the lowest score is higher than said score threshold, and
assess that the speaker having uttered said speech is the known speaker of the predefined set of known speakers corresponding to said lowest score if said lowest score is lower than the score threshold.

Another aspect of the present invention relates to a corresponding method for assessing the identity of a speaker through a speech signal based on speech uttered by said speaker.

According to an embodiment of the present invention, the method comprises:
subdividing said speech signal over time into a set of frames;
spectrally analyzing the frames of the set and discarding frames affected by noise and frames which do not comprise a speech based on such spectral analysis of the frames;
extracting audio features from frames which have not been discarded;
processing the audio features extracted from the frames which have not been discarded for assessing the identity of the speaker.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 5 is a flow chart illustrating the main operations of a speaker recognition procedure carried out by the speaker recognition system of FIG. 1 according to an embodiment of the present invention.

DETAILED DESCRIPTION

Figure 1:
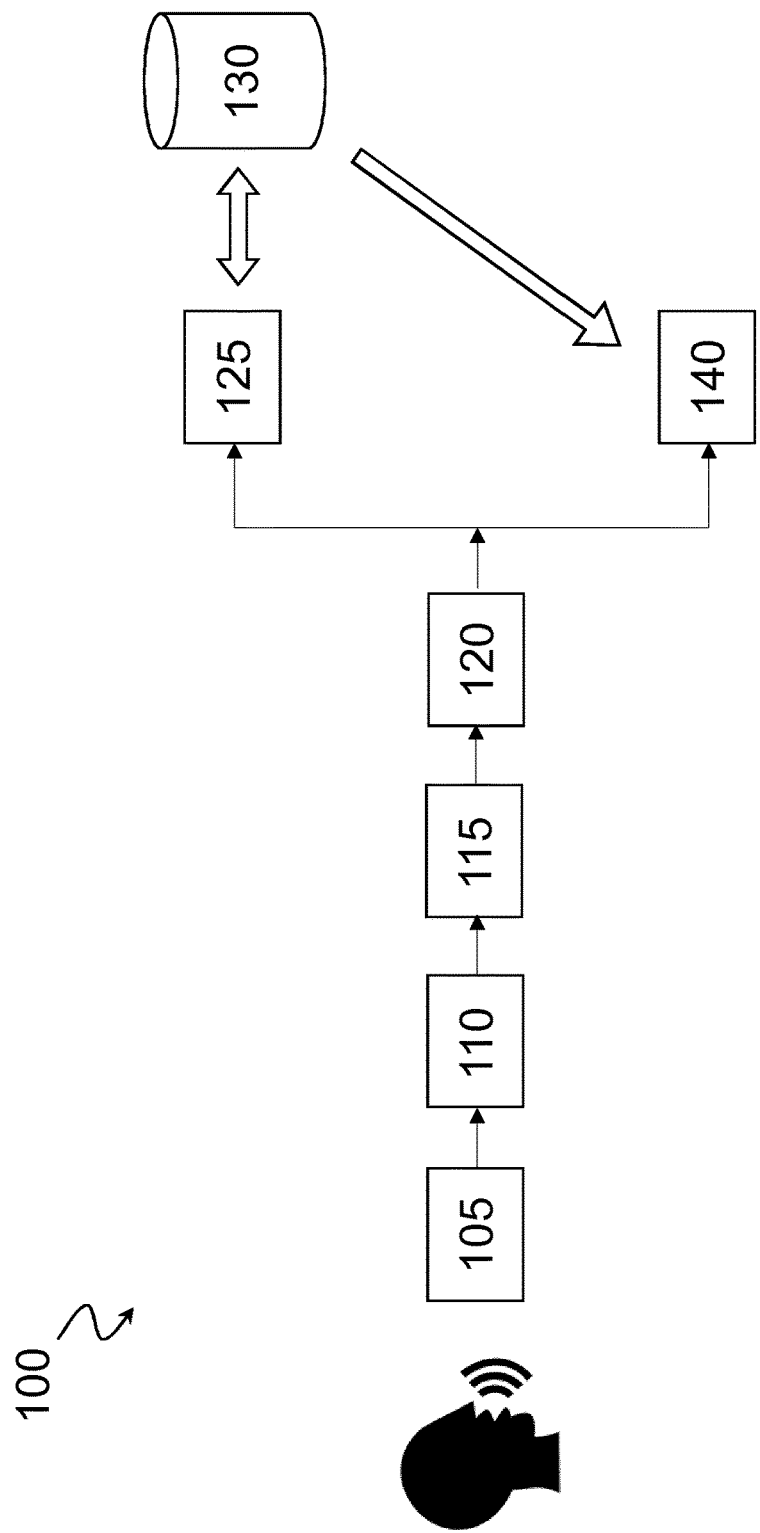
FIG. 1 illustrates in term of functional modules a speaker recognition system according to an embodiment of the present invention.

With reference to the drawings, FIG. 1 illustrates in terms of functional modules a speaker recognition system 100 according to an embodiment of the present invention.

The speaker recognition system 100 which will be described in detail in the following of the present description is configured to assess the identity of a speaker among a predefined set of known speakers. For example, the speaker recognition system 100 may be exploited in a meeting to automatically assess who is speaking among the participants of the meeting. Moreover, the speaker recognition system 100 is also capable of assessing whether the speaker does not belong to any one among the predefined set of known speakers. In this latter case, the speaker recognition system 100 is configured to classify the speaker as "unknown speaker".

However, similar considerations apply if the speaker recognition system 100 is used in different applications, such as for example in a speaker verification scenario to verify whether a speaker is an authorized person or not. In any case, such speaker verification scenario can be viewed also as a special case of the previously mentioned scenario of assessing the identity of a speaker among a predefined set of known speakers, with such predefined set of known speakers that comprises only a single known speaker (i.e., the speaker to be verified).

The speaker recognition system 100 according to the embodiment of the invention illustrated in FIG. 1 comprises a speech acquisition module 105, a framing module 110, a pre-filtering module 115, a feature extraction module 120, a model training module 125, a model database module 130, and a classification module 140.

It should be noted that in the present description the term 'module' is herein intended to comprise, but not limited to, hardware, firmware, a combination of hardware and software, software.

For example, a module may be, but is not limited to being, a process running on a processor, a processor, an object, an executable, a thread of execution, a program, and/or a computing device (such as for example a computer, a smartphone, a tablet, a set top box, a conference station, a speaker phone systems, and so on).

In other words, a module may comprise an application being executed on a computing device and/or the computing device itself.

One or more modules may be localized on one computing device and/or distributed between two or more computing devices.

Modules may comprise and/or interact with computer readable media having storing data according to various data structures.

The modules may communicate by exploiting local and/or remote processes, preferably by means of electrical, electromagnetic and/or optical signals providing one or more data packets, such as data packets from one module interacting with another module in a local system, in a distributed system, and/or across a telecommunication and/or data network, such as the Internet.

The speech acquisition module 105 is configured to acquire speech uttered by a speaker and to convert the sound of the speech into a corresponding speech signal SS. For this purpose, the speech acquisition module 105 comprises one or more microphones. For example, according to an exemplificative embodiment of the invention, the speech acquisition module 105 may be comprised in a conference station located in a conference room. According to another exemplificative embodiment of the present invention, the speech acquisition module 105 may be instead the microphone which is integrated in a device such as a computer, a smartphone or a tablet.

Figure 2:
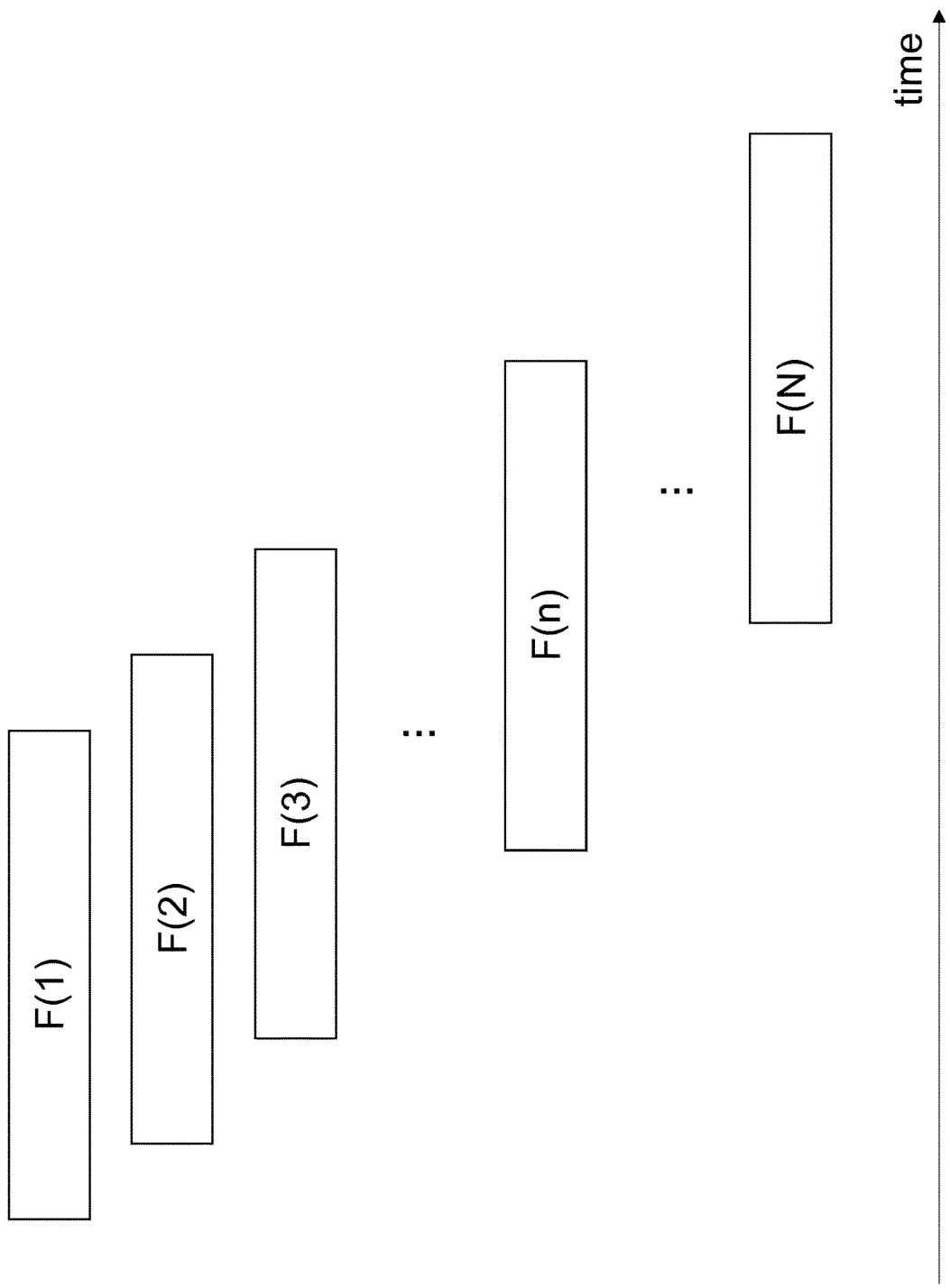
FIG. 2 illustrates how a speech signal is subdivided into frames according to an embodiment of the present invention.

The framing module 110 is configured to receive the speech signal SS and to subdivide it over time into a sequence of signal portions, referred to as frames, F(n) (n=1 to N). According to an embodiment of the present invention illustrated in FIG. 2, the generic frame F(n) of the sequence of frames—except for the last frame F(N)—partially overlaps (over time) the next frame F(n+1) in the sequence.

According to an exemplificative embodiment of the present invention, each frame F(n) may last from 20 ms to 40 ms.

According to an exemplificative embodiment of the present invention, two consecutive frames F(n), F(n+1) are overlapped over time by a percentage between 50% and 90%.

According to an embodiment of the present invention, the duration in time of each frame F(n) and the overlapping percentage of each pair of consecutive frames F(n), F(n+1) are the same for each frame F(n) and for each pair of consecutive frames F(n), F(n+1).

According to another embodiment of the present invention, such duration and/or such overlapping percentage may instead vary.

The segmentation of the speech signal SS into frames F(n) is carried out in order to obtain fragments of the speech signal SS having a limited duration for guaranteeing that within each frame F(n) the statistical properties of the speaker voice are kept constant as much as possible. The overlapping is used to avoid or at least reduce the arising of spurious frequency caused by the segmentation.

According to an embodiment of the present invention, in order to improve the efficiency of the speaker recognition system 100, the pre-filtering module 115 is configured to carry out a spectral analysis of the frames F(n) and accordingly discard the frames F(n) which are assessed to comprise high levels of noise and the frames F(n) which are assessed as not comprising a speech. In this way, the operations carried out by the other modules of the speaker recognition system 100 are performed only on frames F(n) which contains voice and which are not affected by high amounts of noise. This allows to avoid (or at least reduce) speaker recognition accuracy detriment when the speaker is speaking from a position which is not close to the speech acquisition module 105.

Figure 3:
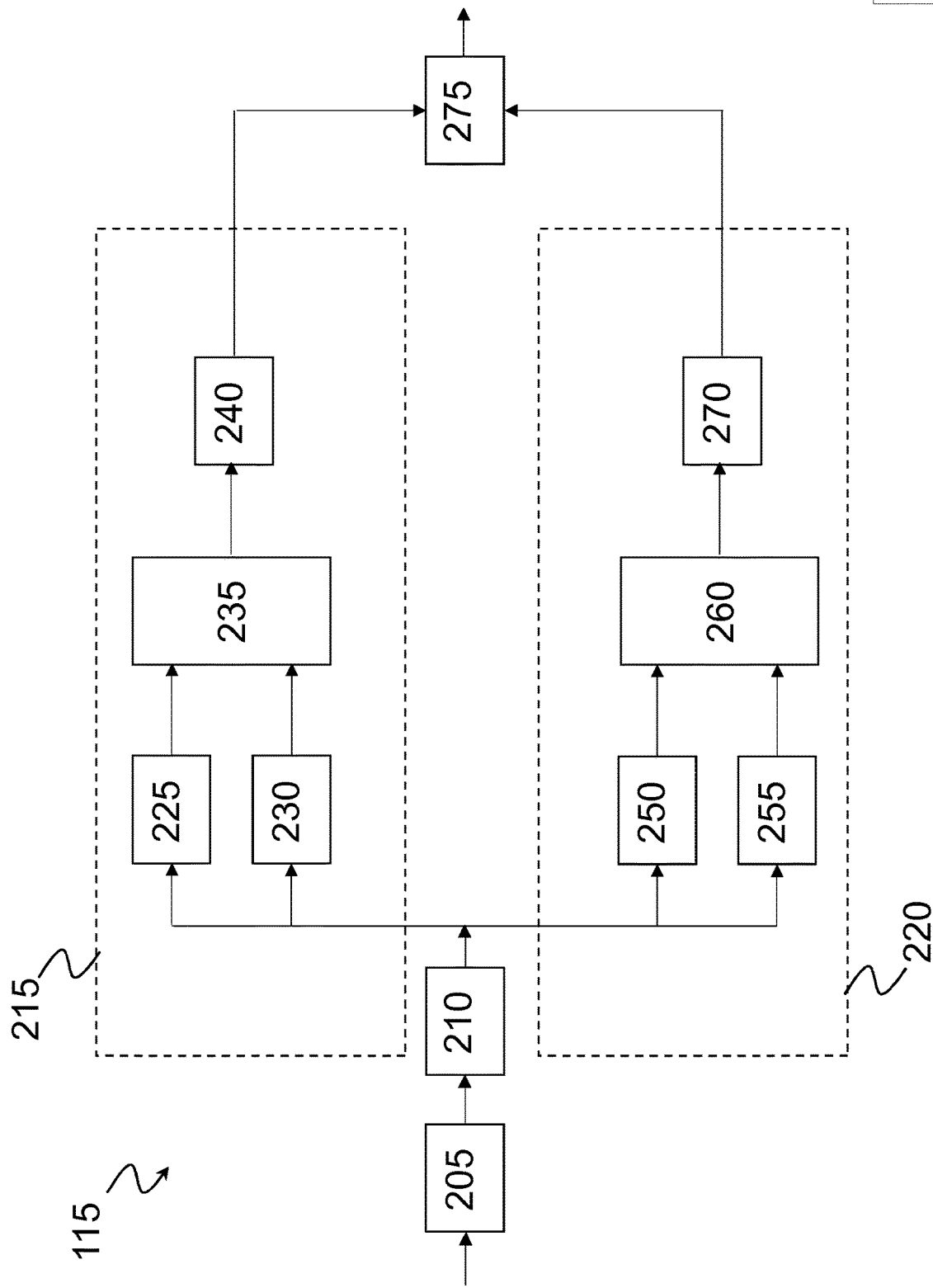
FIG. 3 illustrates a pre-filtering module of the speaker recognition system of FIG. 1 according to an embodiment of the present invention.

FIG. 3 illustrates in greater detail the pre-filtering module 115 according to an embodiment of the present invention.

The pre-filtering module 115 comprises a Discrete Fourier Transform (DFT) module 205 configured to calculate for each received frame F(n) a sequence of (complex) samples which correspond to the DFT of the frame F(n). The samples of the DFT outputted by the DTF module 205 are fed to a squaring module 210 configured to output a further sequence of samples corresponding to the squares of the magnitudes of the DFT samples outputted by the DTF module 205. Therefore, the sequence of samples outputted by the squaring module 210 corresponding to a generic frame F(n) form the energy density D(n) of such frame F(n) over frequency.

According to an embodiment of the present invention, the energy density D(n) of the generic frame F(n) is concurrently fed to a flatness estimator module 215 and to an energy estimator module 220. As will be described in detail in the following of the present description, both the flatness estimator module 215 and the energy estimator module 220 are configured to assess whether the frame F(n) corresponding to the received energy density D(n) has to be discarded because it does not comprise a speech or is affected by an excessive amount of noise.

Both the flatness estimator module 215 and the energy estimator module 220 are configured to perform the same assessment provided above, but under a respective different point of view.

More specifically, according to an embodiment of the present invention, the flatness estimator module 215 is configured to assess whether a generic frame F(n) has to be discarded based on the flatness of the spectrum of the frame F(n). Indeed, the spectrum of human voice exhibits three separate peaks in the frequency domain. Consequently, if the energy density D(n) of a generic frame F(n) is assessed to be flat, it means that such frame F(n) does not comprise a speech, and/or such frame is too noisy (and therefore needs to be discarded).

According to an embodiment of the present invention, the energy estimator module 220 is configured to assess whether a generic frame F(n) has to be discarded based on how the spectral energy of the frame F(n) is distributed over frequency. Indeed, human voice has the majority of its energy (about 90%) which is below 1 KHz. Consequently, if a generic frame F(n) is assessed to have a substantial amount of energy (calculated through the energy density D(n) thereof) above a frequency threshold (e.g., corresponding to 1 KHz), it means that such frame F(n) does not comprise a speech, and/or such frame is too noisy (and therefore needs to be discarded).

According to an embodiment of the present invention, the flatness estimator module 215 comprises an arithmetic mean module 225 configured to calculate the arithmetic mean AM(n) of the samples forming the energy density D(n) corresponding to the generic frame F(n).

According to an embodiment of the present invention, the flatness estimator module 215 further comprises a geometric mean module 230 configured to calculate the geometric mean GM(n) of the samples forming the energy density D(n) corresponding to the generic frame F(n).

According to an embodiment of the present invention, the flatness estimator module 215 further comprises a ratio module 235 configured to calculate a flatness parameter FP(n) of the energy density D(n) corresponding to the (e.g., logarithm of the) ratio of the geometric mean GM(n) to the arithmetic mean AM(n). For example, according to an embodiment of the present invention, the flatness parameter FP(n) is a number calculated in the following way:

$$FP(n) = 10 \cdot \text{Log}\left(\frac{GM(n)}{AM(n)}\right)$$

A frame F(n) having a substantially flat energy density D(n)—because the frame F(n) does not comprise a speech, and/or because the frame is very noisy—has the ratio GM(n)/AM(n) which is close to 1, and therefore the corresponding flatness parameter FP(n) which is substantially low (in absolute value). Conversely, a frame F(n) having an energy density D(n) which exhibits peaks has corresponding flatness parameters FP(n) which are much higher (in absolute value).

According to an embodiment of the present invention, the flatness estimator module 215 further comprises a comparator module 240 configured to compare the flatness parameters FP(n) with a corresponding threshold FTH. If the flatness parameters FP(n) is higher than the threshold FTH, it means that the frame F(n) has a substantially flat energy density D(n), meaning in turn that the frame F(n) at least does not comprise a speech or it is affected by an excessive amount of noise. In this case, the frame F(n) should be discarded. Exemplary values for the threshold FTH may belong to the range ]−∞, 0], such as for example −6.

According to an embodiment of the present invention, the energy estimator module 220 comprises a low frequency energy calculator module 250 configured to calculate, from the energy density D(n) corresponding to the generic frame F(n), the energy LE(n) of the frame F(n) pertaining to the frequencies below an upper frequency threshold LTH, such as for example 1 KHz.

According to an embodiment of the present invention, the energy estimator module 220 further comprises a frame energy calculator module 255 configured to calculate, from the energy density D(n) corresponding to the generic frame F(n), the total energy TE(n) of the frame F(n). According to an embodiment of the present invention, the energy estimator module 220 further comprises a ratio module 260 configured to calculate the energy parameter EP(n)=LE(n)/TE(n).

Frames F(n) having a substantial amount of energy above the upper frequency threshold LTH—because the frame F(n) does not comprise a speech, and/or because the frame is very noisy—have the energy parameter EP(n) that is substantially lower than 1. Conversely, a frame F(n) whose total energy is mainly confined at frequency lower than the upper frequency threshold LTH have the energy parameter EP(n) that is close to 1.

According to an embodiment of the present invention, the energy estimator module 220 further comprises a comparator module 270 configured to compare the energy parameter EP(n) with a corresponding threshold ETH. If the energy parameter EP(n) is lower than the threshold ETH, it means that the frame F(n) has a substantial amount of energy above the upper frequency threshold LTH, i.e., in a part of the spectrum in which human voice has no significant components, meaning in turn that such frame F(n) at least does not comprise a speech or is affected by an excessive amount of noise. In this case, the frame F(n) should be discarded. Exemplary values for the threshold ETH may range from 0 to 1, such as for example 0.76.

According to an embodiment of the present invention, the pre-filtering module 115 further comprises a frame selection module 275 configured to discard a frame F(n) if at least one among the flatness estimator module 215 and the energy estimator module 220 has provided an indication that such frame F(n) should be discarded.

For this purpose, according to an exemplary embodiment of the present invention, the frame selection module 275 is coupled with the outputs of the comparator modules 240 and 270 and is configured to discard a frame F(n) if at least one among the following conditions is verified:

the flatness parameters FP(n) is higher than the threshold FTH, and the energy parameter EP(n) is lower than the threshold ETH.

If instead neither the flatness estimator module 215 nor the energy estimator module 220 have provided an indication that such frame F(n) should be discarded, such as in the case in which the flatness parameters FP(n) is lower than the threshold FTH and at the same time the energy parameter EP(n) is higher than the threshold ETH, the frame F(n) is kept.

According to an alternative embodiment of the present invention, the pre-filtering module 115 may comprise only the flatness estimator module 215 or only the energy estimator module 220 instead of both of them. In this case, the decision made by the frame selection module 275 whether to keep or discard a frame F(n) is carried out based on the outcome of the flatness estimator module 215 or of the energy estimator module 220 only.

For example, according to an embodiment of the present invention in which only the flatness estimator module 215 is provided, the frame selection module 275 may be configured to keep a frame F(n) when the flatness parameters FP(n) is lower than the threshold FTH, and to discard it when the flatness parameters FP(n) is higher than the threshold FTH.

According to another embodiment of the present invention, in which only the energy estimator module 220 is provided, the frame selection module 275 may be configured to keep a frame F(n) when the energy parameter EP(n) is higher than the threshold ETH, and to discard it when the energy parameter EP(n) is lower than the threshold ETH.

The pre-filtering module 115 is configured to carry out the operations described above for each frame F(n) the speech signal SS has subdivided into.

After the last frame F(N) has been processed by the pre-filtering module 115, only the frames which have been not discarded are provided to the following modules of the speaker recognition system 100 for being processed in order to recognize the speaker which generated the speech signal SS.

In the following of the present description, the frames which have not been discarded by the pre-filtering operations carried out by the pre-filtering module 115 are identified as F'(n), (n=1 to N'), where N'≤N. N' is equal to N only in case no frame F(n) has been discarded.

According to an embodiment of the present invention, the feature extraction module 120 is configured to extract from the frames F'(n) audio features which are useful to characterize the audio content of the captured speech signal SS.

According to an embodiment of the present invention, the audio features extracted by the feature extraction module 120 are the known Mel Frequency Cepstrum Coefficients (MFCC) and their second derivative components, referred to as DeltaDelta coefficients, as in "*SPECTRA: A SPEech proCessing plaTform as smaRtphone Application*" by I. Bisio, F. Lavagetto, M. Marchese, A. Sciarrone, C. Frá and M. Valla, 2015 IEEE International Conference on Communications (ICC), London, 2015, pp. 7030-7035.doi: 10.1109/ICC.2015.7249447 and in "*A novel approach for MFCC feature extraction*" by M. A. Hossan, S. Memon and M. A. Gregory, 2010 4th International Conference on Signal Processing and Communication Systems, Gold Coast, Q L D, 2010, pp. 1-5, doi: 10.1109/ICSPCS.2010.5709752.

For each frame F'(n), the feature extraction module 120 is configured to calculate K MFCC coefficients C(n)(k) (k=1 to K) and K DeltaDelta coefficients ΔΔ(n)(k) (k=1 to K). The K MFCC coefficients [C(n)(1), . . . , C(n)(k), . . . , C(n)(K)]=C(n) and the K DeltaDelta coefficients [ΔΔ(n)(1), . . . , ΔΔ(n)(k), . . . , ΔΔ(n)(K)]=ΔΔ(n) generated by the feature extraction module 120 for the frame F'(n) are arranged in a single vector of 2K elements, hereinafter referred to as feature vector X(n)=[C(n) ΔΔ(n)].

The number K of MFCC coefficients extracted by the feature extraction module 120 should be set taking into consideration that the higher the number of extracted audio features, the better the speaker recognition quality, but at the same time the higher the amount of computation load and energy consumption. According to an embodiment of the present invention, K is selected in the interval [1, 20]. According to a preferred embodiment of the present invention, K is set equal to 13, so that the feature vector X(n) is a vector having 26 elements.

According to an embodiment of the present invention, the speaker recognition system 100 is configured to classify speakers by using Support Vector Machines (SVM) trained according to the One-Against-All (OAA) approach. The use of SVMs trained according to the OAA approach is well known to those skilled in the art. On this regard, see for example, "*Support Vector Machines for Speaker and Language Recognition*" by W. M. Campbell, J. P. Campbell, D. A. Reynolds, E. Singer, P. A. Torres-Carrasquillo, MIT Lincoln Laboratory, Computer Speech & Language, Volume 20, Issues 2-3, April-July 2006, Pages 210-229.

According to an embodiment of the present invention, having a predefined set of H known speakers SP(h) (h=1 to H), each speaker SP(h) is associated to a corresponding SVM, identified as SVM(h). The generic SVM SVM(h) is a binary classifier which is configured to carry out decisions exploiting a mathematical model—hereinafter identified as speaker model MS(h)—of the voice of the speaker SP(h). The SVM SVM(h) is configured to receive a feature vector X(n) of a generic frame F'(n) and accordingly select one among the two following conditions C0, C1:

C0: the frame F'(n) contains speech of the speaker SP(h);
C1: the frame F'(n) does not contain speech of the speaker SP(h).

The selection of the condition is carried out by comparing the received feature vector X(n) with the speaker model MS(h).

According to an embodiment of the present invention, the model training module 125 is configured to generate the speaker models MS(h) of the various SVM SVM(h) by carrying out known training procedures well known to those skilled in the art which exploit frames F'(n) obtained from the capturing of speech uttered by speakers SP(h) whose identity is already known. For example, the model training module 125 may be configured to carry out the known training procedure described in "*LIBSVM: A library for support vector machines*," by C.-C. Chang and C.-J. Lin, ACM Transactions on Intelligent Systems and Technology, vol. 2, pp. 27:1-27:27, 2011 (software available at http://www.csie.ntu.edu.tw/cjlin/libsvm).

According to an embodiment of the present invention, data forming the speaker models MS(h) are stored in the model database module 130, ready to be exploited during the speaker recognition operations carried by the classification module 140 which will be described in the following.

According to an embodiment of the present invention, the speaker models MS(h) may be further classified into "male speaker" and "female speaker" classes, so that final decision could be taken among speakers of the same gender.

It has to be appreciated that even if reference has been made to a classification exploiting SVM trained according to OAA approach, similar considerations apply in case the SVM are trained according to a One-Against-One (OAO) approach.

Moreover, the concepts of the present invention can be applied also in those case in which in addition to or in place of the SVM, Hidden Markov Models (HMM) and/or Gaussian Mixture Models (GMM) are employed.

Figure 4:
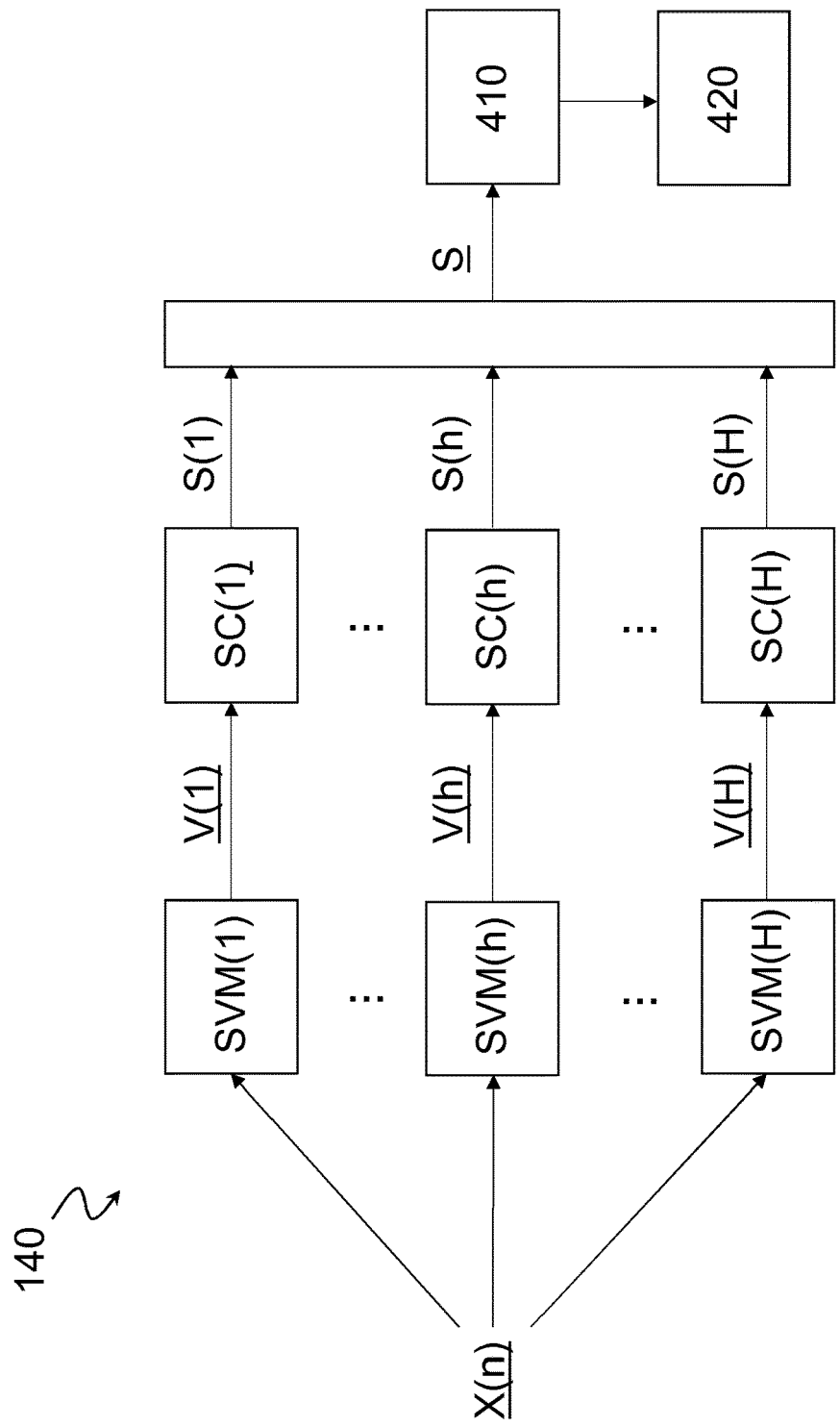
FIG. 4 illustrates a classification module according to an embodiment of the present invention.

According to an embodiment of the present invention, the classification module 140 is configured to process the feature vectors X(n) generated by the feature extraction module 120 to accordingly identify the identity of the speaker SP(h) having uttered the speech captured in the speech signal SS. As illustrated in FIG. 4, the classification module 140 comprises H SVM SVM(h) (h=1 to H), each one corresponding to a respective speaker SP(h) among the predefined set of H known speakers SP(h). The SVM SVM(h)

are built by the classification module 140 by exploiting the speaker models MS(h) retrieved from the model database module 130.

Each feature vector X(n) corresponding to frame F'(n) (n=1 to N') is fed to all the H SVM SVM(h).

Each SVM SVM(h) accordingly selects one among the abovementioned conditions C0, C1 based on a comparison between the received feature vector X(n) and the speaker model MS(h), and outputs a corresponding binary value V(h)(n), such as for example "0" if condition C0 has been selected and "1" if condition C1 has been selected.

In this way, after all the N' feature vectors X(n) are fed to the SVM SVM(h), a corresponding N-dimensional output vector V(h)=[V(h)(1), . . . , V(h)(n), . . . , V(h)(N)] is generated for each SVM SVM(h), which contains the binary values V(h)(n) generated by the latter. Therefore, each n-th element V(h)(n) of the output vector V(h) provides an indication about the condition selected by the SVM SVM(h) with respect to the n-th frame F'(n). According to the convention employed in the exemplary embodiment taken at issue, if the n-th element V(h)(n) of the output vector V(h) corresponding to the k-th SVM SVM(h) is equal to 0, it means that the frame F'(n) has been assessed to contain speech uttered by the speaker SP(h) corresponding to such SVM SVM(h); if instead V(h)(n) is equal to 1, it means that the frame F'(n) has been assessed not to contain speech uttered by the speaker SP(h) corresponding to such SVM SVM(h).

According to an embodiment of the present invention, each output vector V(h) is provided to a respective score computation module SC(h) which is configured to calculate a corresponding score value S(h) according to the following formula:

$$S(h) = -2r\left(\frac{\sum_{n=1}^{N'} V(h)(n)}{N'} - \frac{1}{2}\right)$$

Since each output vector V(h) is generated by taking into account all the N' frames F'(n), it comprises information on how the speech pertaining the N' frames F'(n) is related to the speaker SP(h). The score value S(h) is calculated in such a way to assume a value ranging from +r to −r, wherein r corresponds to the case in which all the N' frames F'(n) have been assessed to contain speech uttered by the speaker SP(h) and −r corresponds to the case in which no frame F'(n) has been assessed to contain speech uttered by the speaker SP(h). In other words, the score S(h) quantifies the likelihood that the speaker whose speech has generated the frames F'(n) is the h-th speaker SP(h) among the predefined set of H known speakers SP(h). The higher the score value S(h), the higher the probability that the speaker having uttered the speech captured in the speech signal SS is the h-th speaker SP(h). For example, r may be equal to 1.

According to an embodiment of the present invention, the H score values S(h) are arranged in a H-element score vector S=[S(1), . . . , S(h), . . . , SA] which is provided to an unknown-speaker decision module 410 configured to assess whether the speaker whose speech has generated the frames F'(n) belongs to one of the H known speakers SP(h) of the predefined set or not.

According to an embodiment of the present invention, the unknown-speaker decision module 410 is configured to compare the highest score value S(h) of the score vector S to a threshold UTH. If such highest score value S(h) is lower than the threshold UTH, the unknown-speaker decision module 410 assesses that the frames F'(n) have been generated from a speech uttered by a person that is not included in the H known speakers SP(h) of the predefined set. In this case, the speech signal SS is classified as being generated by an "unknown speaker". If, instead, the highest score value S(h) is higher than the threshold UTH, the unknown-speaker decision module 410 assesses that the frames F'(n) have been generated from a speech uttered by one of the H known speakers SP(h) of the predefined set. In this case, the speech signal is classified as being generated by the speaker SP(h) corresponding to the highest score value S(h). According to an embodiment of the present invention, the threshold UTH may range from −0.5 to 0.5, such as for example it may be equal to 0.

If the unknown-speaker decision module 410 has assessed that the speaker having generated the frames F'(n) is one of the H known speakers SP(h) of the predefined set, the score vector S is fed to a speaker identification module 420. The speaker identification module 420 is configured to identify the actual speaker having generated the frames F'(n) as the one among the H known speakers SP(h) of the predefined set having the highest score value S(h) in the score vector S.

Considering an example in which the set of known speakers comprises H=3 known speakers SP(1), SP(2), SP(3), and the corresponding score vector S is equal to [S(1)=0.7, S(2)=0.1, S(3)=−0.3], the highest score value S(h) is S(1)=0.7, corresponding to the known speaker SP(1). If such value is lower than the threshold UTH, the speech signal is classified as being generated by an unknown speaker. If such value is instead higher than the threshold UTH, the speech signal is classified as being generated by the speaker SP(1).

Naturally, similar considerations apply if the score value S(h) is calculated in a different way, such as in such a way that the lower the score value S(h), the higher the probability that the speaker having uttered the speech captured in the speech signal SS is the h-th speaker SP(h). In this case, as can be easily comprised by those skilled in the art, the score value S(h) which is compared to the threshold UTH and which is used to identify the speaker will be the lowest one, the comparison will provide to classify the speech signal SS as being generated by a "unknown speaker" if the lowest score value S(h) is higher than the threshold UTH, and the speech signal will be classified as being generated by the speaker SP(h) corresponding to the lowest score value S(h).

FIG. 5 is a flow chart which illustrates the main operations of a speaker recognition procedure carried out by the speaker recognition system 100 according to an embodiment of the present invention.

The first operation (block 510) provides for retrieving the speech signal SS. For example, this can be carried out by directly acquiring the voice of the speaker through a microphone of the speech acquisition module 105, or by retrieving a speech signal SS acquired before.

The next operation (block 520) provides for subdividing the speech signal SS into frames F(n). This is carried out by the framing module 100.

The frames F(n) are then analyzed, and the ones that have been assessed to comprise high levels of noise and/or as not comprising a speech are discarded (block 530). This operations are carried out by the pre-filtering module 115.

The next operation (block 540) provides for extracting audio features from the not discarded frames F'(n) which are useful to characterize the audio content of the speech signal SS. The extraction of the audio features is carried out by the feature extraction module 520.

For each one of the known speakers SP(h) belonging to the predefined set of speakers, a score S(h) is calculated which quantifies the likelihood that the speaker whose speech has generated the frames F'(n) is that specific known speaker SP(h) (block 550). This is calculated by the score computation modules SC(h) of the classification module 140.

At this point (decision block 560), the highest or lowest score S(h) is compared to a threshold UTH. Based on this comparison, the speech signal SS may be classified as being generated by an unknown speaker (exit branch A of decision block 560, going to block 570) or the speech signal may be classified as being generated by the speaker SP(h) corresponding to such highest or lowest score S(h) (exit branch B of decision block 560, going to block 580). These operations are carried out by the unknown-speaker decision module 410 and by the speaker identification module.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A speaker recognition system for assessing the identity of a speaker through a speech signal based on speech uttered by said speaker, the system comprising:
    a processor configured to
    subdivide said speech signal over time into a set of overlapping frames that overlap with respect to each other;
    perform spectral analysis of the frames of the set to discard frames affected by noise and frames which do not comprise a speech;
    extract audio features from frames which have not been discarded; and
    process the audio features extracted from the frames which have not been discarded for assessing the identity of the speaker;
    generate likelihood scores for each of a predefined set of known speakers;
    compare a highest score among likelihood scores generated for each known speaker of the predefined set to a score threshold;
    assess that the speaker having uttered said speech does not belong to the predefined set of known speakers if the highest score is lower than said score threshold; and
    assess that the speaker having uttered said speech is the known speaker of the predefined set of known speakers corresponding to said highest score if said highest score is higher than the score threshold.

2. The system of claim 1, wherein the processor is further configured to assess whether a frame has to be discarded based on a flatness of a frequency spectrum of such frame.

3. The system of claim 2, wherein said processor is further configured to discard a frame if said frame has a substantially flat spectrum.

4. The system of claim 3, wherein the processor is further configured to assess the flatness of the spectrum of a frame by generating a corresponding flatness parameter based on a ratio of:
    a geometric mean of samples of an energy density of said frame;
    to
    an arithmetic mean of said samples of the energy density of said frame.

5. The system of claim 4, wherein the processor is further configured to assess that said frame has to be discarded if the corresponding flatness parameter is higher than a corresponding first threshold.

6. The system of claim 1, wherein the processor is further configured to assess whether a frame has to be discarded based on how a spectral energy of said frame is distributed over frequency.

7. The system of claim 6, wherein said processor is further configured to discard a frame if said frame has a substantial amount of energy above an upper frequency threshold.

8. The system of claim 7, wherein the processor is further configured to calculate an energy parameter of a corresponding frame based on a ratio of:
    an energy of the frame pertaining to frequencies lower than said upper frequency threshold;
    to
    a total energy of the frame, wherein:
    the processor is further configured to assess that said frame has to be discarded if the corresponding energy parameter is lower than a second threshold.

9. The system of claim 1, wherein the likelihood score is score quantifying a likelihood that a speaker having uttered said speech is said known speaker, said processor generating the score being based on said audio features extracted from the frames which have not been discarded.

10. The system of claim 9, wherein the processor is further configured to:
    compare a lowest score among the scores generated for each known speaker of the predefined set to a score threshold;
    assess that the speaker having uttered said speech does not belong to the predefined set of known speakers if the lowest score is higher than said score threshold, and
    assess that the speaker having uttered said speech is the known speaker of the predefined set of known speakers corresponding to said lowest score if said lowest score is lower than the score threshold.

11. A method for assessing the identity of a speaker through a speech signal based on speech uttered by said speaker, the method comprising:
    subdividing, with a processor, said speech signal over time into a set of overlapping frames that overlap with respect to each other;
    spectrally analyzing, with the processor, the frames of the set and discarding frames affected by noise and frames which do not comprise a speech based on such spectral analysis of the frames;
    extracting, with the processor, audio features from frames which have not been discarded;
    processing, with the processor, the audio features extracted from the frames which have not been discarded for assessing the identity of the speaker;
    generating likelihood scores for each of a predefined set of known speakers;

comparing a highest score among likelihood scores generated for each known speaker of the predefined set to a score threshold;

assessing that the speaker having uttered said speech does not belong to the predefined set of known speakers if the highest score is lower than said score threshold; and assessing that the speaker having uttered said speech is the known speaker of the predefined set of known speakers corresponding to said highest score if said highest score is higher than the score threshold.

12. The system of claim 1, wherein an overlap amount for consecutive frames of the set of overlapping frames is fixed for all frames.

13. The system of claim 1, wherein an overlap amount between consecutive frames of the set of overlapping frames varies among the frames.

\* \* \* \* \*